United States Patent
Mizuno et al.

(10) Patent No.: US 11,815,980 B2
(45) Date of Patent: Nov. 14, 2023

(54) ELECTRONIC DEVICE, CONTROL METHOD, AND RECORDING MEDIUM FOR CONTROLLING SWITCHING FIRST CONTROLLER AND SECOND CONTROLLER TO COMMUNICATOR

(71) Applicant: CASIO COMPUTER CO., LTD., Tokyo (JP)

(72) Inventors: Kimiyasu Mizuno, Akishima (JP); Tsuyoshi Minami, Musashimurayama (JP); Shuhei Uchida, Hamura (JP); Munetaka Seo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/721,467

(22) Filed: Apr. 15, 2022

(65) Prior Publication Data

US 2022/0244774 A1    Aug. 4, 2022

Related U.S. Application Data

(63) Continuation of application No. 16/837,445, filed on Apr. 1, 2020, now Pat. No. 11,347,299.

(30) Foreign Application Priority Data

Apr. 2, 2019  (JP) .................. 2019-070680

(51) Int. Cl.
*G06F 1/3293* (2019.01)
*G04G 19/00* (2006.01)
*G06F 1/3234* (2019.01)

(52) U.S. Cl.
CPC ........... *G06F 1/3293* (2013.01); *G04G 19/00* (2013.01); *G06F 1/3265* (2013.01)

(58) Field of Classification Search
CPC ........ G04G 19/00; G04G 19/12; G04G 21/02; G04G 21/04; G04G 7/00; G06F 1/3265; G06F 1/3293; G06F 1/3206; Y02D 10/00
(Continued)

(56) References Cited

U.S. PATENT DOCUMENTS

| | | | | |
|---|---|---|---|---|
| 5,802,305 A | * | 9/1998 | McKaughan | ........... H04L 12/12 709/227 |
| 6,366,957 B1 | * | 4/2002 | Na | ........................ G06F 21/575 709/229 |

(Continued)

FOREIGN PATENT DOCUMENTS

| | | |
|---|---|---|
| JP | 2007-529918 A | 10/2007 |
| JP | 2012-121194 A | 6/2012 |

(Continued)

OTHER PUBLICATIONS

"Apple Watch wakes up when you raise your wrist #AppleWatch", https://www.gizmodo.jp/2015/04/apple_watch_applewatch_6.html. Apr. 24, 2015, Gizmodo Japan.
(Continued)

*Primary Examiner* — Chun Cao
(74) *Attorney, Agent, or Firm* — Scully, Scott, Murphy & Presser, P.C.

(57) ABSTRACT

An electronic device includes a memory; a first processor; a second processor for which power consumption is lower than power consumption of the first processor; a communicator that communicates with an external device; and a switch that switches a connection destination of the communicator to the first processor or the second processor. The second processor is configured to, in a case in which a condition for transitioning to a power suppression state that is an operating state in which power consumption is suppressed is satisfied, connect the communicator by the switch. The first processor is configured to, in a case in which a (Continued)

condition for transitioning to a normal state that is a normal operating state is satisfied, connect the communicator by the switch.

12 Claims, 12 Drawing Sheets

(58) Field of Classification Search
USPC .................................................. 713/320, 323
See application file for complete search history.

(56) References Cited

U.S. PATENT DOCUMENTS

| | | | |
|---|---|---|---|
| 6,501,999 | B1 | 12/2002 | Cai |
| 7,398,408 | B2 * | 7/2008 | Paljug .................... H04L 12/12 713/323 |
| 7,421,602 | B2 | 9/2008 | Sutardja |
| 11,347,299 | B2 * | 5/2022 | Mizuno .................. G04G 21/02 |
| 2005/0066209 | A1 | 3/2005 | Kee et al. |
| 2005/0182980 | A1 | 8/2005 | Sutardja |
| 2008/0244289 | A1 | 10/2008 | LeProwse et al. |
| 2011/0154082 | A1 | 6/2011 | Parks et al. |
| 2012/0100895 | A1 | 4/2012 | Priyantha et al. |
| 2012/0159218 | A1 | 6/2012 | Vangala et al. |
| 2013/0222270 | A1 * | 8/2013 | Winkler ............ H04M 1/72448 345/1.3 |
| 2016/0088562 | A1 | 3/2016 | Seo et al. |
| 2017/0075316 | A1 | 3/2017 | Berdinis et al. |
| 2017/0177067 | A1 | 6/2017 | Okada et al. |
| 2018/0020350 | A1 | 1/2018 | Vissa et al. |
| 2019/0191375 | A1 * | 6/2019 | Cheng .................. H04L 1/1607 |
| 2020/0319698 | A1 | 10/2020 | Mizuno et al. |

FOREIGN PATENT DOCUMENTS

| | | | |
|---|---|---|---|
| JP | 2013250737 | A | 12/2013 |
| JP | 2016-066129 | A | 4/2016 |
| JP | 2016-161324 | A | 9/2016 |
| JP | 2016157332 | A | 9/2016 |
| JP | 2017117121 | A | 6/2017 |
| JP | 2017-146614 | A | 8/2017 |
| JP | 2017162111 | A | 9/2017 |
| JP | 2018-105890 | A | 7/2018 |
| WO | 2014/087551 | A1 | 6/2014 |
| WO | WO-2017023511 | A * | 2/2017 |

OTHER PUBLICATIONS

Notice of Reasons for Refusal dated Jun. 22, 2021 received in Japanese Patent Application No. JP 219-070680 together with an English language translation.

Office Action dated Jun. 2, 2021 received in U.S. Appl. No. 16/837,445.

Office Action dated Sep. 22, 2021 received in U.S. Appl. No. 16/837,445.

Notice of Allowance dated Jan. 28, 2022 received in U.S. Appl. No. 16/837,445.

Notice of Reasons for Refusal dated Jun. 22, 2021 received in Japanese Patent Application No. JP 2019-070680 together with an English language translation.

Notice of Reasons for Refusal dated Jan. 10, 2023 received in Japanese Patent Application No. JP 2021-210028.

Notice of Reasons for Refusal dated Apr. 25, 2023 received in Japanese Patent Application No. JP 2021-210028.

* cited by examiner

ELECTRONIC DEVICE, CONTROL METHOD, AND RECORDING MEDIUM FOR CONTROLLING SWITCHING FIRST CONTROLLER AND SECOND CONTROLLER TO COMMUNICATOR

CROSS-REFERENCE TO RELATED APPLICATION

This application is a continuation application of U.S. patent application Ser. No. 16/837,445 filed on Apr. 1, 2020, which is based upon and claims the benefit of priority under 35 USC 119 of Japanese Patent Application No. 2019-070680 filed on Apr. 2, 2019, the entire disclosure of which, including the description, claims, drawings, and abstract, is incorporated herein by reference in its entirety.

FIELD

This application relates generally to an electronic device such as an electronic watch, a control method for the electronic device, and a recording medium.

BACKGROUND

Small electronic devices with advanced functionality, such as smart watches, are popular. The power consumption of advanced electronic devices is high and, when battery voltage decreases, all of the functions of the electronic device, including basic functions such as clock functions, stop. One example of a solution for this problem is the electronic watch disclosed in Unexamined Japanese Patent Application Kokai Publication No. 2016-161324. This electronic watch has a configuration whereby basic functions (clock functions and the like) can be maintained over an extended period of time by carrying out function limiting that corresponds to the voltage of a secondary battery.

SUMMARY

In a first aspect of the present disclosure, an electronic device includes:
 a memory;
 a first processor;
 a second processor for which power consumption is lower than power consumption of the first processor;
 a communicator that communicates with an external device; and
 a switch that switches a connection destination of the communicator to the first processor or the second processor, wherein
  in a case in which a condition for transitioning to a power suppression state that is an operating state in which power consumption is suppressed is satisfied, the second processor is to connect the communicator by the switch, and
  in a case in which a condition for transitioning to a normal state that is a normal operating state is satisfied, the first processor is to connect the communicator by the switch.

In a second aspect of the present disclosure a control method for an electronic device including a first processor, a second processor for which power consumption is lower than that of the first processor, and a communicator that is compatible with a first communication method and a second communication method that enables communication at lower power consumption than that of the first communication method includes:
 when a condition for transitioning to a power suppression state that is an operating state in which power consumption is suppressed is satisfied, transitioning, by the second processor, the first processor to a sleep state in which power consumption is suppressed, and switching, by the second processor, communication by the communicator to communication by the second communication method; and
 when a condition for transitioning to a normal state that is a normal operating state is satisfied, recovering the first processor from the sleep state, and switching, by the first processor, the communication by the communicator to communication by the first communication method.

In a third aspect of the present disclosure, a non-transitory computer-readable recording medium having stored therein a program that causes a computer of an electronic device including a first processor, a second processor for which power consumption is lower than that of the first processor, and a communicator that is compatible with a first communication method and a second communication method that enables communication at lower power consumption than that of the first communication method to execute processing of:
 when a condition for transitioning to a power suppression state that is an operating state in which power consumption is suppressed is satisfied, transitioning, by the second processor, the first processor to a sleep state in which power consumption is suppressed, and switching, by the second processor, communication by the communicator to communication by the second communication method; and
 when a condition for transitioning to a normal state that is a normal operating state is satisfied, recovering the first processor from the sleep state, and switching, by the first processor, the communication by the communicator to communication by the first communication method.

BRIEF DESCRIPTION OF THE DRAWINGS

A more complete understanding of this application can be obtained when the following detailed description is considered in conjunction with the following drawings, in which.

DETAILED DESCRIPTION

Figure 1:
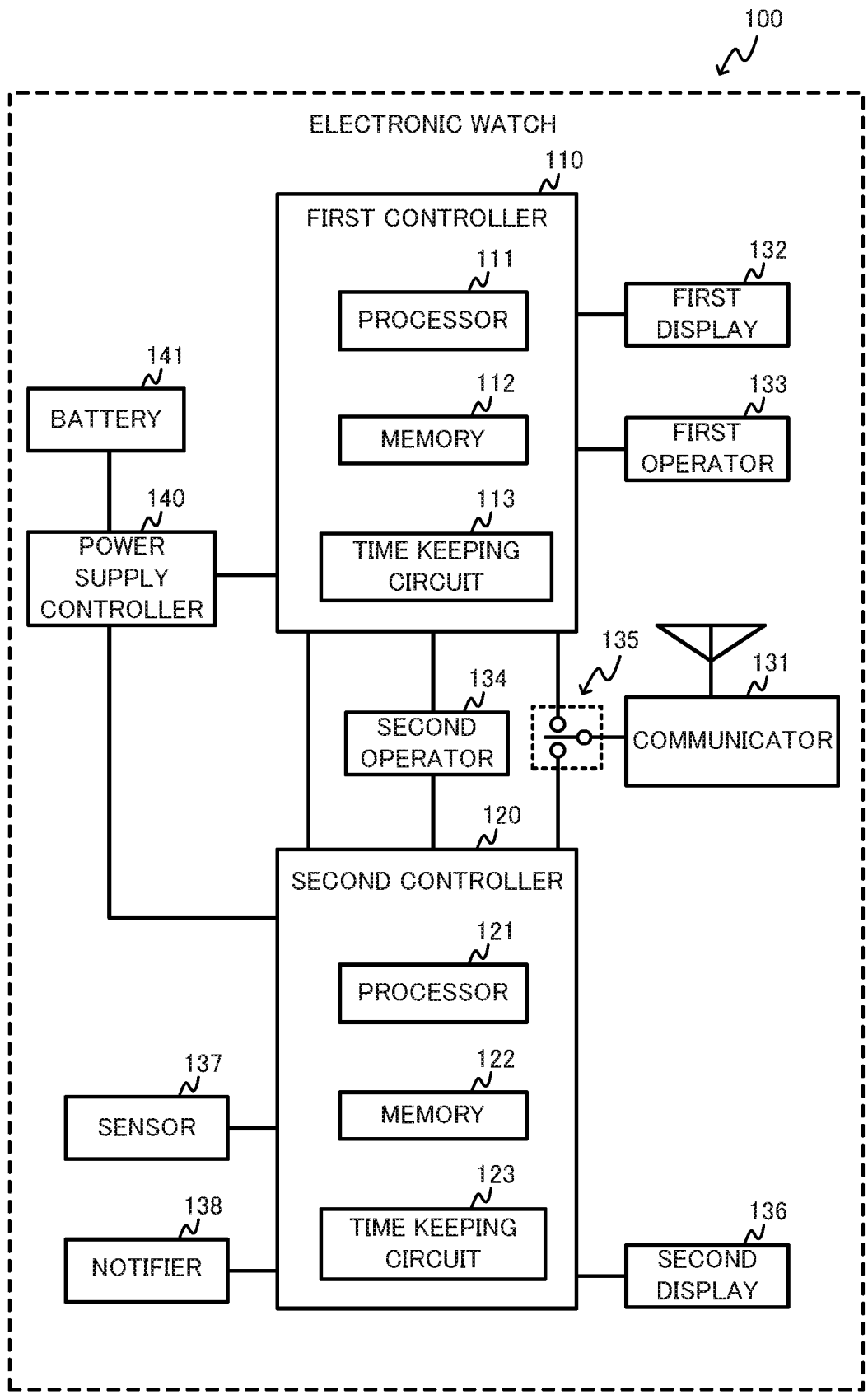
FIG. 1 is a drawing illustrating a configuration example of an electronic watch according to Embodiment 1.

Hereinafter, embodiments are described while referencing the drawings. Note that, in the drawings, identical or corresponding components are marked with the same reference numerals.

Embodiment 1

As illustrated in FIG. 1, an electronic watch 100 that is an example of the electronic device according to Embodiment 1 includes, as functional components, a first controller 110, a second controller 120, a communicator 131, a first display 132, a first operator 133, a second operator 134, a second display 136, a sensor 137, a notifier 138, a power supply controller 140, and a battery 141.

The first controller 110 includes a processor 111 (first processor), a memory 112, and a time keeping circuit 113. The first controller 110 realizes the functions of the electronic watch 100 as a result of the processor 111 executing a program stored in the memory 112. The first controller 110 includes a function for suppressing power consumption by causing the first controller 110 to sleep. While in the sleep state, the operations of the first controller 110 are basically stopped. When an interrupt signal (wake-up signal) is received from outside, the first controller 110 recovers from the sleep state, assumes an active state, and starts the operations.

The processor 111 is a central processing unit (CPU) with high processing power (for example, a 64-bit CPU with an operating frequency of 1 GHz) that can implement an advanced operating system (OS) such as Android.

The memory 112 includes random access memory (RAM), read-only memory (ROM), and the like. The memory 112 is provided with capacity capable of covering most of the capacity required to realize all of the functions of the electronic watch 100. Note that, the memory 112 is not limited to being provided in the first controller 110, and may be provided outside the first controller 110.

The time keeping circuit 113 measures a time that the electronic watch 100 displays. Note that the time keeping circuit 113 may be configured from software that changes a value stored in the memory 112 every predetermined time (for example, every one second), or may be configured from dedicated hardware. The time measured by the time keeping circuit 113 may be any of cumulative time from a predetermined timing, coordinated universal time (UTC), standard time of a region or country such as Japan Standard Time (JST), the time of a preset city (local time), or the like. Additionally, the time measured by the time keeping circuit 113 need not be in a year-month-day-hour-minute-second format. Note that, the time keeping circuit 113 is not limited to being provided in the first controller 110, and may be provided outside the first controller 110.

The second controller 120 includes a processor 121 (second processor), a memory 122, and a time keeping circuit 123 that measures the time of the electronic watch 100. The second controller 120 realizes functions of the low power consumption operating state of the electronic watch 100 as a result of the processor 121 executing a program stored in the memory 122.

The processor 121 is a CPU that has lower functionality and a slower speed than the processor 111 (for example, a 16-bit CPU with an operating frequency of 16 MHz). As such, the processor 121 is not suited for an advanced operating system. However, the processor 121 has lower power consumption than the processor 111. Moreover, the processor 121 is capable of intermittent operation. As a result of this intermittent operation, the processor 121 can be made to operate for only a short period of time of, for example, once per second, thereby enabling operation at a significantly lower power consumption than the processor 111.

The memory 122 includes RAM, ROM, and the like, and is provided with capacity required for the operations of the processor 121. Note that, the memory 122 and the time keeping circuit 123 are not limited to being provided in the second controller 120, and may be provided outside the second controller 120. For example, a configuration is possible in which all or a part of the memory 112 provided in the first controller 110 is usable as the memory 122 by the second controller 120. Another configuration is possible in which the memory 112 and the memory 122 are implemented as the same external memory, and this same memory is used by both the first controller 110 and the second controller 120.

As with the time keeping circuit 113, the time keeping circuit 123 measures the time that the electronic watch 100 displays. As with the time keeping circuit 113, the time keeping circuit 123 may be configured from software or from dedicated hardware. As with the time keeping circuit 113, the type and format of the time measured by the time keeping circuit 123 are not limited. Note that, the time keeping circuit 123 is not limited to being provided in the second controller 120, and may be provided outside the second controller 120. Another configuration is possible in which the time keeping circuit 113 and the time keeping circuit 123 are implemented as the same external time keeping circuit, and this same time keeping circuit is used by both the first controller 110 and the second controller 120.

The communicator 131 is a device for wirelessly communicating with another external device (for example, a smartphone). The communicator 131 is a communication device that is compatible with a first communication method that enables high-speed communication (for example, a communication method that is compatible with the Serial Port Profile Bluetooth (registered trademark) Classic communication standard), and is compatible with a second communication method for which power consumption is lower than that of the first communication method (for example, a communication method that is compatible with the General Attribute Profile Bluetooth (registered trademark) Low Energy (hereinafter referred to as "BLE") communication standard).

In one example, the communication between the communicator 131 and the first controller 110 or the second controller 120 is performed by a Universal Asynchronous Receiver/Transmitter (UART). In the present embodiment, a switch 135 is inserted on this communication line. The switch 135 switches the connection destination of the communicator 131 to the first controller 110 or the second controller 120. However, the setting of the connection destination of the communicator 131 of the first controller 110 is set to input or high impedance when the first controller 110 is in a sleep state and the UART when the first controller 110 is in an active state; and the setting of the connection destination of the communicator 131 of the second controller 120 is set to UART when the first controller 110 is in the sleep state and to input or high impedance when the first controller 110 is in the active state. As a result, the communicator 131 and the first controller 110 and the second controller 120 can be connected by the communication line without passing through the switch 135.

The first display 132 is a high-definition display capable of displaying color. For example, the first display 132 is a high-definition color liquid crystal display (LCD). However, the first display 132 is not limited to an LCD, and may be an electro-luminescence (EL) display or the like. The first display 132 displays high-definition time and/or an image resulting from the execution of an application/software of the advanced OS.

The first operator 133 includes a touch panel module that is overlaid on the first display 132 and a second display 136. The first operator 133 receives input operations from a user via the touch panel module, and sends, to the first controller 110, electronic signals corresponding to the input operations as input signals. In one example, when the user touches the display of the electronic watch 100, the first operator 133 generates an interrupt signal (wake-up signal), and notifies the first controller 110 that the display has been touched. The first operator 133 detects a contact position and/or a contact mode related to the contact operation on the touch panel module by the user, and sends an operation signal corresponding to the detected contact position and/or contact mode to the first controller 110. A user interface (UI) of the advanced OS is realized by the first display 132 and the first operator 133. The first operator 133 functions as an operation acquirer that acquires user operations.

The second operator 134 includes a crown and/or a button. The second operator 134 receives input operations from the user via the crown and/or the button, and sends, to first controller 110 and the second controller 120, electronic signals corresponding to the input operations as input signals. In one example, the second operator 134 receives an instruction such as time setting or display switching from the user via the crown and/or the button, and sends this instruction to the first controller 110 and the second controller 120.

Note that, in FIG. 1, the first operator 133 is only connected to the first controller 110, and the second operator 134 is connected to the first controller 110 and the second controller 120. However, this is merely an example, and the connection destinations are not limited to this example. For example, configurations are possible in which the first operator 133 is connected to the first controller 110 and the second controller 120, and in which the first operator 133 is only connected to the second controller 120. Moreover, configurations are possible in which the second operator 134 is only connected to the first controller 110 or is only connected to the second controller 120.

In one example, the second display 136 is a display such as a monochrome segment LCD or the like. The power consumption of the second display 136 is lower than the power consumption of the first display 132. The second display 136 can display the time and other information by segments or the like.

The sensor 137 includes sensors such as acceleration sensors, geomagnetic sensors, barometric pressure sensors, and the like. The second controller 120 can acquire the movement, orientation, altitude, and other information of the electronic watch 100 on the basis of the information detected by the sensor 137.

The notifier 138 includes a buzzer and/or a vibration motor. The notifier 138 can notify the user that a time set as an alarm has arrived, that some sort of message has been received, or the like by sounding the buzzer and/or causing the electronic watch 100 to vibrate using the vibration motor.

The power supply controller 140 converts power supply voltage from the battery 141 to a desired voltage, and supplies power to the various devices inside the electronic watch 100. The power supply controller 140 is capable of turning the power supplied to each device (power supply) ON and OFF on the basis of instructions from the first controller 110 and the second controller 120.

The functional configuration of the electronic watch 100 is described above. Next, a protocol stack of each communication method is described while referencing FIG. 2. As illustrated on the left side in FIG. 2, the first communication method realizes communication by a processing route 1 consisting of Physical Layer→Link Manager→L2CAP (Logical Link Control & Adaption Protocol)→RFCOMM (Radio Frequency COMMunication) Protocols→Serial Port Profile. Of these, the Physical Layer and the Link Manager are implemented on the communicator 131. The L2CAP, the RFCOMM Protocols, and the Serial Port Profile are implemented on the first controller 110.

Figure 2:
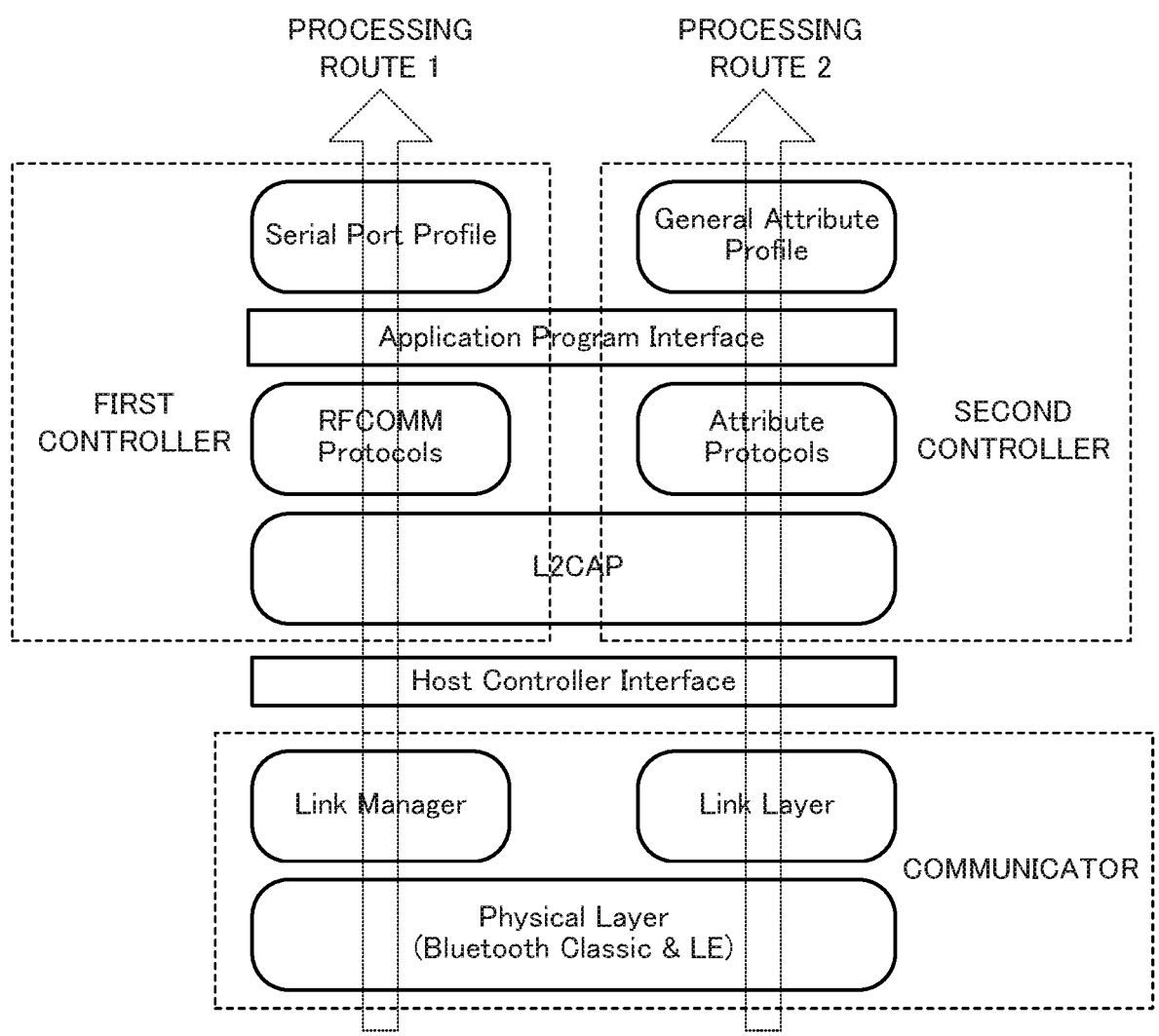
FIG. 2 is a drawing explaining a protocol stack according to Embodiment 1.

As illustrated on the right side in FIG. 2, the second communication method realized communication by a processing route 2 consisting of Physical Layer→Link Layer→L2CAP→Attribute Protocols→General Attribute Profile. Of these, the Physical Layer and the Link Layer are implemented on the communicator 131. The L2CAP, the Attribute Protocols, and the General Attribute Profile are implemented on the second controller 120.

Figure 3:
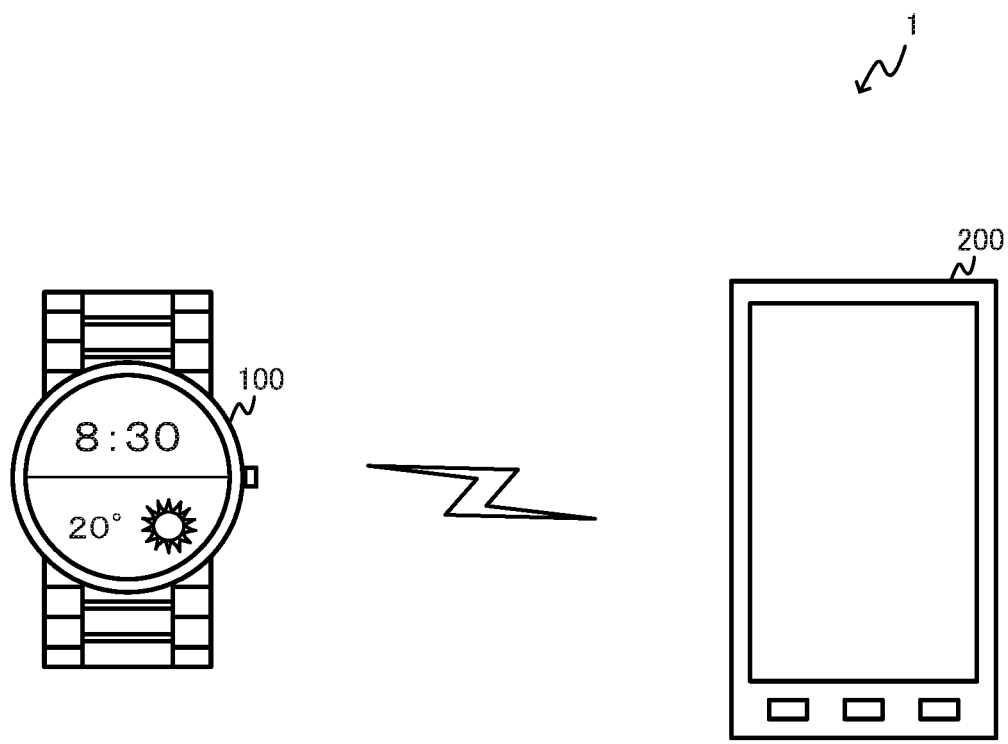
FIG. 3 is a drawing illustrating a configuration example of an electronic device system according to Embodiment 1.

The protocol stack of each communication method is described above. As illustrated in FIG. 3, the electronic watch 100 forms an electronic device system 1 together with a smartphone 200. The smartphone 200 is wirelessly connected to and wirelessly communicates with the electronic watch 100 via Bluetooth (registered trademark). As such, the smartphone 200 can send a received e-mail, for example, to the electronic watch 100 via Bluetooth (registered trademark).

By using the first communication method that enables high-speed communication on the advanced OS described above, the electronic watch 100 can receive an e-mail, including the body and attachments, sent from the smartphone 200 in a comparatively short amount of time. Moreover, by using the functions of the advanced OS, the electronic watch 100 can display the body of the e-mail or all of the body, the attachments, and the like of the e-mail. Therefore, in this case, the user can confirm the e-mail on the electronic watch 100 without confirming on the smartphone 200.

However, there are cases in which, in order to suppress power consumption, the electronic watch 100 stops (sleeps, or the like) the first controller 110 and performs the processing by the second controller 120, or uses the second communication method without using the first communication method. As described above, the processor 121 of the second controller 120 is not suited for the implementation of an advanced OS, and the communication speed of the second communication method is slow. Accordingly, in cases in which the electronic watch 100 is suppressing power consumption, the electronic watch 100 considers the processing speed of the processor 121 and the communication speed of the second communication method and performs only the minimum communication needed instead of receiving all of the body and the like of the e-mail. As a result, the power consumption of the electronic watch 100 can be lowered.

Accordingly, in such cases, the electronic watch 100 uses the processor 121 to display an incoming e-mail icon that indicates that an e-mail has been received. Note that, the level of functionality provided by the processor 121 can be set as desired. For example, in this case, the electronic watch 100 may display the sender and/or the subject of the e-mail instead of or in addition to displaying the incoming e-mail icon. It is assumed that the types of notification signals that the smartphone 200 sends to the electronic watch 100 while connected to the electronic watch 100 by the second communication method are set in advance in the smartphone 200.

Thus, with the electronic watch 100, all of the functions of the electronic watch 100 are executed when the processor 111 is operating but, when the processor 111 is not operating, only limited functions (for example, clock functions, incoming e-mail icon display functions, pedometer functions, biological information (pulse or the like) detection functions, and the like), which are a portion of all of the functions, are executed. However, in cases in which it is sufficient that only the limited functions are executed, there is no need to operate the processor 111 (it is possible to put the processor 111 in a sleep state or in a power OFF state). As such, the power consumption of the electronic watch 100 can be held to a low value.

The two types of operating states of the electronic watch 100 mentioned above are described while referencing FIG. 4. The operating state in which the processor 111 (main CPU) of the electronic watch 100 is operating is referred to as the "normal operating state." The operating state in which the processor 111 is not operating (only the processor 121 (sub CPU) is operating as a processor) is referred to as the "low power consumption operating state." The low power consumption operating state is also referred to as the "power suppression state."

Figure 4:
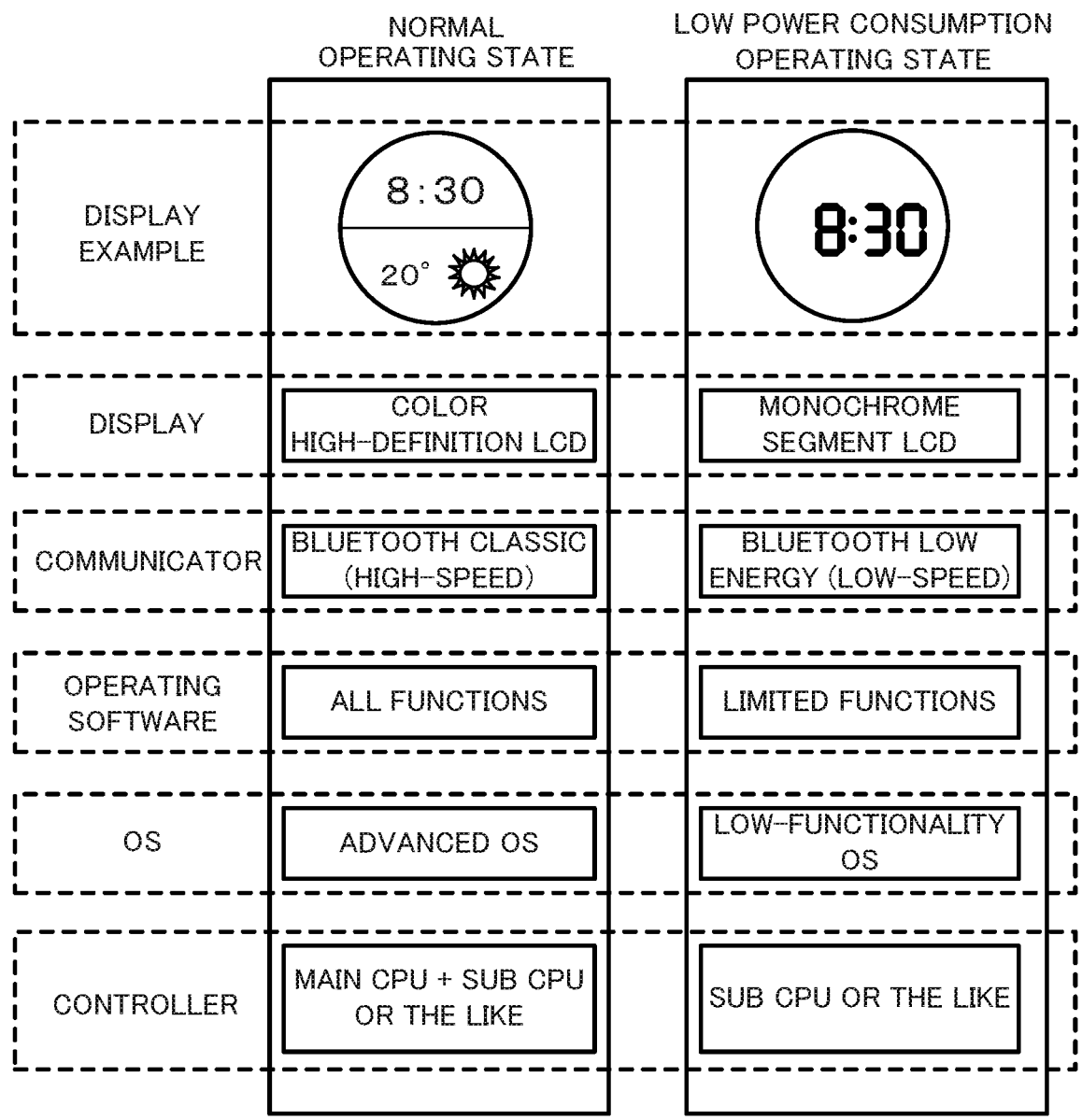
FIG. 4 is a drawing that compares a normal operating state and a low power consumption operating state according to Embodiment 1.

In the low power consumption operating state, the second controller 120, the first operator 133, the second operator 134, the communicator 131 using the second communication method, the second display 136, the sensor 137, the notifier 138, and the power supply controller 140 operate. Moreover, as illustrated in FIG. 4, a time display using monochrome segments is carried out by the second display 136. In addition, although low-speed, low power consumption BLE communication can be carried out by the communicator 131 that uses the second communication method. Furthermore, the processing of the limited functions is possible by the low power consumption processor 121 and the low-functionality OS. Since the functions are limited, and operations are carried out by the processor 121, the BLE, and the monochrome segment LCD, the power consumption of the electronic watch 100 decreases.

In the normal operating state, in addition to the hardware that operates in the low power consumption operating state, the first controller 110 and the first display 132 operate, and the communicator 131 operates using the first communication method. However, in the normal operating state, the second display 136 may be placed in a sleep state or in a power OFF state. Moreover, as illustrated in FIG. 4, in the normal operating state, high-definition color displaying by the first display 132 is carried out. In addition, high-speed communication by Bluetooth (registered trademark) Classic can be carried out by the communicator 131 that uses the first communication method. Furthermore, the high-speed processor 111 and the advanced OS are capable of executing the processing of all of the functions of the electronic watch 100. However, due to the hardware operations by the processor 111, the Bluetooth (registered trademark) Classic, and the high-definition color LCD, the power consumption of the electronic watch 100 in the normal operating state is greater than the power consumption in the low power consumption operating state.

Figure 5:
FIG. 5 is a drawing illustrating structures of a first display and a second display according to Embodiment 1.
Figure 5:
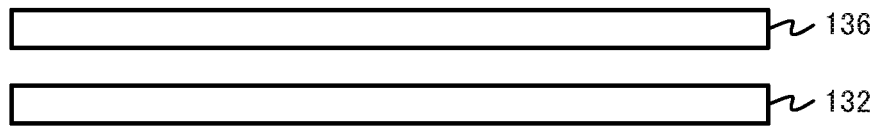

Note that, as illustrated in the "Display Examples" of FIG. 4, the display of the monochrome segment LCD is not visible in the normal operating state, and the display of the high-definition LCD is not visible in the low power consumption operating state. As illustrated in FIG. 5, the various types of displaying are realized due to the display having a structure in which the second display 136 is overlaid on the first display 132, and setting the display of the second display 136 to a transparent state when the electronic watch 100 is in the normal operating state. In the normal operating state, the second display 136 is in the transparent state and, as such, only the display of the first display 132 can be seen from eyes E. In the low power consumption operating state, the first display 132 is not driven and, as such, only the display of the second display 136 can be seen from the eyes E. Due to this configuration, the electronic watch 100 can achieve the display of information desired by the user and a decrease in power consumption in a well-balanced manner.

The electronic watch 100 operates by switching between the two operating states described above in accordance with the situation. One example of a situation in which the operating state switches from the normal operating state to the low power consumption operating state is a situation in which a predetermined amount of time (an amount of time set by the user or the like such as five seconds, ten seconds, one minute, or the like) has continued without a user operation. Examples of situations in which the operating state switches from the low power consumption operating state to the normal operating state are situations in which the user operates the touch panel of the electronic watch 100 or a notification signal that indicates an incoming call is received from the smartphone 200.

Figure 6:
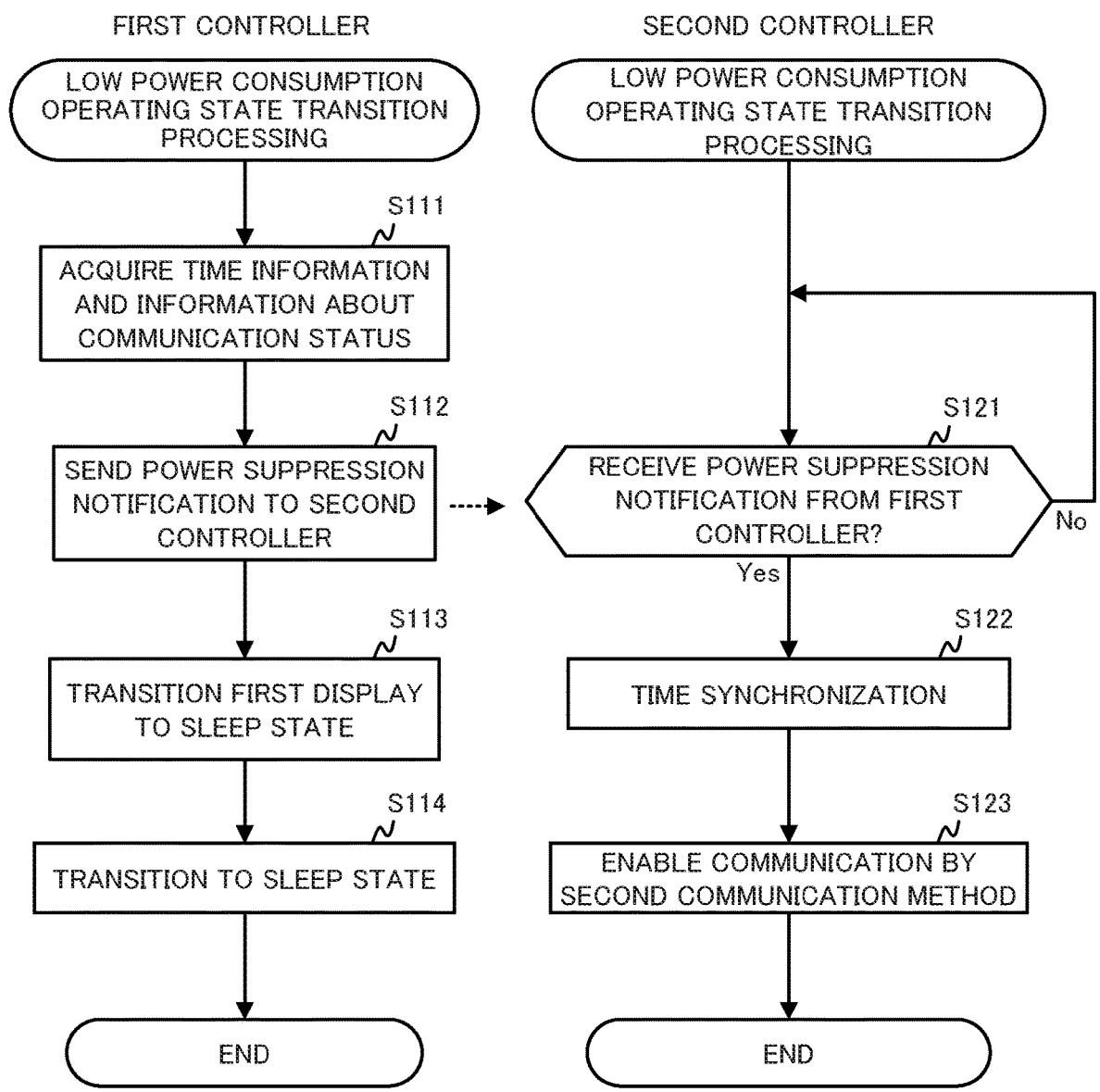
FIG. 6 is a flowchart of low power consumption operating state transition processing according to Embodiment 1.

Next, processing (low power consumption operating state transition processing) performed when the electronic watch 100 switches from the normal operating state to the low power consumption operating state is described while referencing FIG. 6.

First, the first controller 110 acquires time information measured by the time keeping circuit 113, and information about a communication status of the communicator 131 that uses the first communication method (step S111). Next, the first controller 110 sends, to the second controller 120, the time information and the information about the communication status and, also a notification (power suppression notification) informing of transitioning to the low power consumption operating state (step S112).

Then, the first controller 110 transitions the first display 132 to the sleep state (step S113), and transitions the first controller 110 to the sleep state (step S114).

Meanwhile, in the normal operating state, the second controller 120 waits for a power suppression notification to be sent from the first controller 110 (step S121). If the second controller 120 does not receive a power suppression notification (step S121; No), step S121 is executed. If the second controller 120 receives a power suppression notification (step S121; Yes), the second controller 120 synchronizes, on the basis of the time information included in the notification, the time information measured by the time keeping circuit 123 with the time measured by the time keeping circuit 113.

Next, the second controller 120 switches the switch 135, thereby connecting the second controller 120 to the communicator 131 and, on the basis of the information about the communication status included in the power suppression notification, sets the communication with the partner, that the first controller 110 performs by the communicator 131 that uses the first communication method, as being restartable using the second communication method (step S123). Then, the low power consumption operating state transition processing is ended. Note that the processing of steps S122 and S123 may be performed in any order. For example, the processing of step S123 may be performed and, thereafter, the processing of step S122 may be performed. Additionally, the first controller 110 may carry out the switching of the switch 135 between step S111 and step S112.

As a result of the low power consumption operating state transition processing described above, the electronic watch 100 switches from the normal operating state to the low power consumption operating state. The low power consumption operating state transition processing is also referred to as a "power suppression transition step." Note that, it is thought that there will be cases in which it is difficult to restart the communication using the second communication method on the basis of the information about the communication status by the first communication method. In such cases, the communication with the communication partner is disconnected in step S111, and processing for reconnecting to the communication partner is carried out in step S123.

Figure 7:
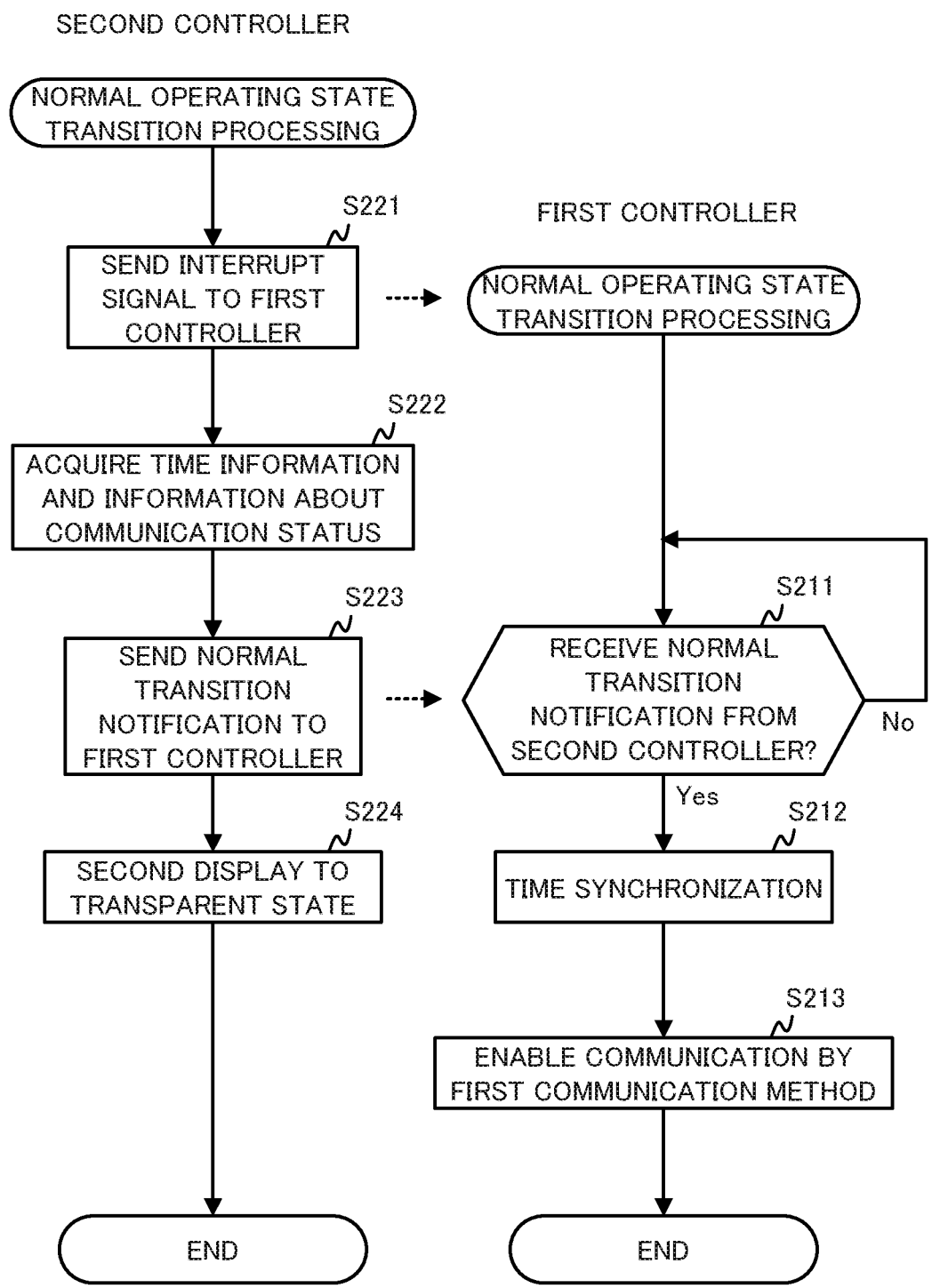
FIG. 7 is a flowchart of normal operating state transition processing according to Embodiment 1.

Next, processing (normal operating state transition processing) performed when the electronic watch 100 switches from the low power consumption operating state to the normal operating state is described while referencing FIG. 7.

First, the second controller 120 sends an interrupt signal (wake-up signal) to the first controller 110, thereby causing the first controller 110 to recover from the sleep state (step S221). Note that the switching from the low power consumption operating state to the normal operating state is also performed when the user touches the first operator 133 (the touch panel). However, in this case, the first operator 133 sends the interrupt signal (wake-up signal) to the first controller 110 and causes the first controller 110 to recover from the sleep state. Then, the first controller 110, which has recovered from the sleep state due to the interrupt signal from the first operator 133, sends a notification (send request notification) to the second controller 120 requesting that a normal transition notification (described later) be sent. Then, the second controller 120 that has received the send request notification starts the processing from step S222 of the normal operating state transition processing.

The second controller 120 that sends the interrupt signal to the first controller 110 or the second controller 120 that receives the send request notification from the first controller 110 acquires time information measured by the time keeping circuit 123 and information about the communication status of the communicator 131 by the second communication method (information about connection with communication partner, or the like) (step S222).

Next, the second controller 120 sends, to the first controller 110, the time information and the information about the communication status and, also, a notification (normal transition notification) informing of transitioning to the normal operating state (step S223). Then, the second controller 120 sets the second display 136 to the transparent state (step S224).

Meanwhile, when the interrupt signal (wake-up signal) is received, the first controller 110 recovers from the sleep state and starts the normal operating state transition processing. The first controller 110 waits for a normal transition notification to be sent from the second controller 120 (step S211). If the first controller 110 does not receive a normal transition notification (step S211; No), step S211 is executed. If the first controller 110 receives a normal transition notification (step S211; Yes), the first controller 110 synchronizes, on the basis of the time information included in the notification, the time information measured by the time keeping circuit 113 with the time measured by the time keeping circuit 123 (step S212).

Next, the first controller 110 switches the switch 135, thereby connecting the first controller 110 to the communicator 131 and, on the basis of the information about the communication status included in the power suppression notification, sets the communication with the partner, that the second controller 120 performs by the communicator 131 using the second communication method, as being restartable using the first communication method (step 213). Then, the normal operating state transition processing is ended. Note that the processing of steps S212 and S213 may be performed in any order. For example, the processing of step S213 may be performed and, thereafter, the processing of step S212 may be performed. Additionally, the second controller 120 may carry out the switching of the switch 135 between step S222 and step S223.

As a result of normal operating state transition processing described above, the electronic watch 100 switches from the low power normal operating state to the normal operating state. The normal operating state transition processing is also referred to as a "normal state transition step." Note that, it is thought that there will be cases in which it is difficult to restart the communication using the first communication method on the basis of the information about the communication status by the second communication method. In such cases, the communication with the communication partner is disconnected in step S222, and processing for reconnecting to the communication partner is carried out in step S213.

Figure 8:
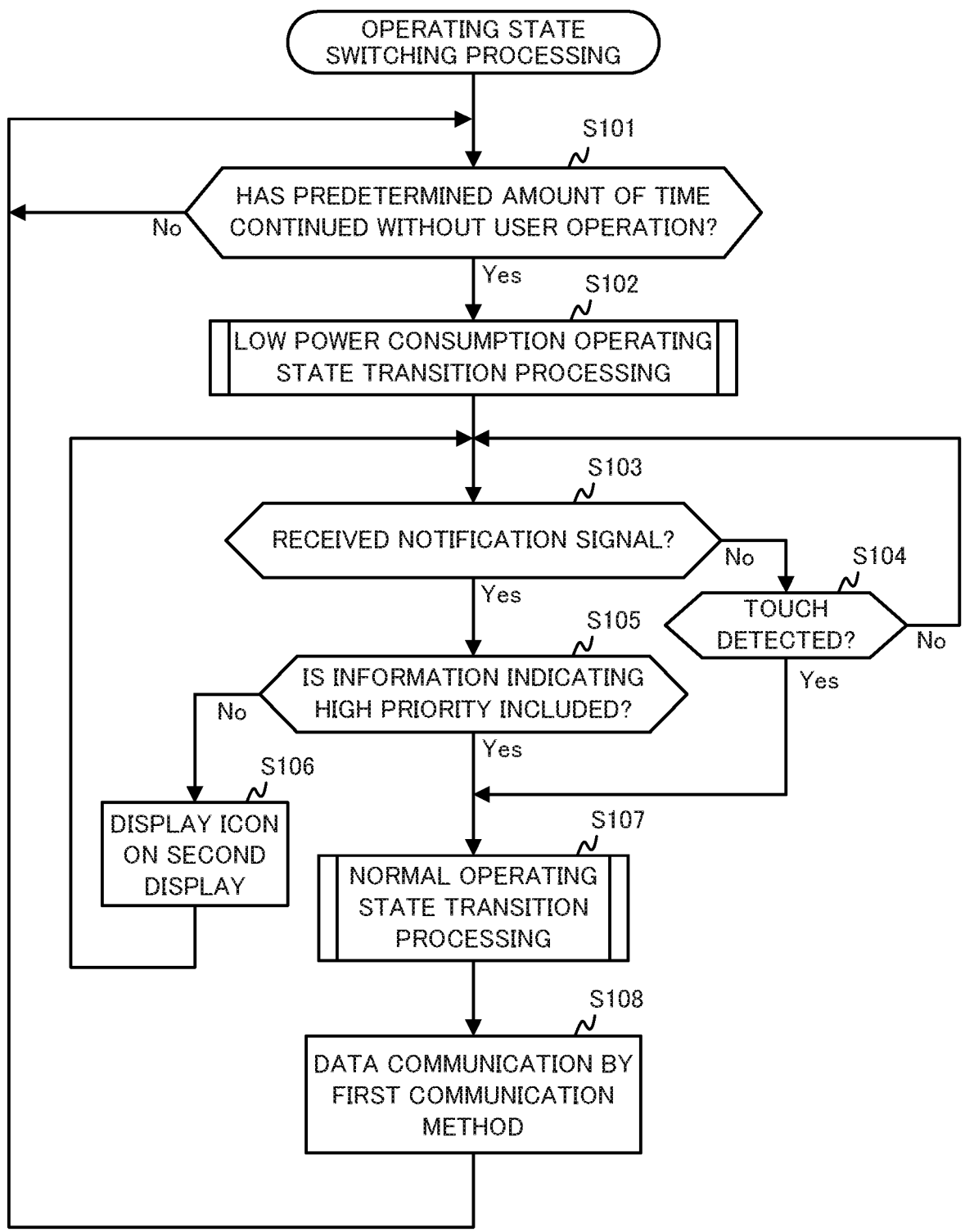
FIG. 8 is a flowchart of operating state switching processing according to Embodiment 1.

Next, operating state switching processing, which is processing for switching the operating state of the electronic watch 100 in accordance with the situation, is described while referencing FIG. 8. When the electronic watch 100 is started up, the operating state switching processing starts up as one thread, and processing starts in parallel with other threads. Note that, in FIG. 8, it is assumed that the electronic watch 100 is in the normal operating state when started up. However, if it is assumed that the electronic watch 100 is in the low power consumption operating state when started up, the operating state switching processing may start from step S103.

The first controller 110 determines, on the basis of signals from the first operator 133 and the second operator 134, whether a predetermined amount of time (for example, three seconds) without a user operation has continued (step S101). If the predetermined amount of time without a user operation has not continued (step S101; No), step S101 is executed.

If the predetermined amount of time without a user operation has continued (step S101; Yes), the first controller 110 and the second controller 120 carry out the low power consumption operating state transition processing described above and the electronic watch 100 transitions to the low power consumption operating state (step S102).

Next, the second controller 120 determines whether the communicator 131 has received, by the second communication method, a notification signal from the smartphone 200 (step S103). Here, the "notification signal" is, for example, a signal notifying that the smartphone 200 has received an incoming call or an e-mail. If the communicator 131 has not received a notification signal (step S103; No), the first operator 133 determines if a touch on the touch panel module by the user is detected (step S104). If a touch is not detected (step S104; No), step S103 is executed. If a touch is detected (step S104; Yes), step S107 is executed.

Meanwhile, if the communicator 131 does receive, by the second communication method, a notification signal in step S103 (step S103; Yes), the second controller 120 determines whether information indicating high priority is included in the notification signal (step S105). The priority is set, in advance, by the user, the e-mail sender, the electronic device system 1, or the like. For example, the information indicating high priority is included in a notification signal informing of an incoming call, a notification signal of an e-mail from a sender set as high priority by the user, or the like. In step S105, the second controller 120 functions as a priority acquirer.

If the information indicating high priority is not included in the notification signal (step S105; No), the second controller 120 displays an icon on the second display 136 (step S106), and executes step S103. Here, the "icon" is, for example, a pattern that indicates the arrival of an e-mail. Various patterns of the icon are formed in the second display 136 by segments.

If the information indicating high priority is included in the notification signal (step S105; Yes), the second controller 120 carries out the normal operating state transition processing described above and causes the first controller 110 to recover from the sleep state, and the electronic watch 100 transitions to the normal operating state (step S107). Then, the first controller 110 starts data communication with the smartphone 200 by the communicator 131 that uses the first communication method (step S108), and carries out the receipt of the e-mail body or the like in accordance with an instruction from the user. Thereafter, step S101 is executed.

The operating state switching processing is described above. As a result of the operating state switching processing described above, the electronic watch 100 is operated for as long a time as possible in the low power consumption operating state, and also transitions quickly to the normal operating state when the user attempts to execute a function other than the limited functions. Therefore, the battery life of the electronic watch 100 can be extended without the user noticing that the electronic watch 100 is in a state in which functions are limited.

Note that, to prevent complicating the description, in the operating state switching processing illustrated in FIG. 8, only the receipt determination of the notification signal (step S103) and the detection determination of the touch (step S104) act as triggers for the transition from the low power consumption operating state to the normal operating state, but the present embodiment is not limited thereto. For example, cases are included in which the color display is displayed due to a movement of the wrist (by a gesture operation) that the user performs to confirm information such as the number of steps on the color display (the first display 132). In such a case, the second controller 120 determines, on the basis of a detected value of the acceleration sensor of the sensor 137, whether a gesture operation is performed and, when a gesture operation is detected, executes step S107. Thus, since the electronic watch 100 also switches to the normal operating state due to gesture operations, concerns about the user feeling operational discomfort due to the low power consumption operating state can be mitigated.

Additionally, a modified example is possible in which the user sets, in advance, whether "the user desires that the icon always be displayed (the user desires that the electronic watch 100 maintain the low power consumption operating state (the power suppression state) as long as possible) and, immediately prior to step S105 of FIG. 8, the second controller 120 determines if "the user setting is that the icon always be displayed." In this modified example, if the determination is Yes, step S106 is executed and, if the determination is No, step S105 is executed. At the time of the determination, the second controller 120 functions as a user setting acquirer.

In this modified example, in cases in which the user has performed the setting of "always display the icon", the electronic watch 100 maintains the low power consumption operating state in which the icon is displayed, even when a notification signal sent from the smartphone 200 is received, and executes step S107 for the first time when a touch operation or a gesture operation by the user is detected. Due to this configuration, the electronic watch 100 can maintain the low power consumption operating state so long as the user does not switch to the normal operating state, and the battery life can be extended a corresponding amount.

While not described above, in the operating state switching processing illustrated in FIG. 8, when transitioning to the normal state in step S107, the second controller 120 may control the notifier 138 and notify the user about the transition to the normal state. For example, a predetermined sound may be output, or the electronic watch 100 may be caused to vibrate in a predetermined vibration pattern. Likewise, when displaying the icon on the second display 136 in step S106, the second controller 120 may control the notifier 138 and notify the user that the icon is displayed. Due to this configuration, when information is received that the user must be notified of immediately, that information can be immediately notified to the user, even when operating in the low power consumption operating state.

Embodiment 2

In Embodiment 1, in the low power consumption operating state, the communicator 131 communicates by the second communication method in order to suppress power consumption. However, provided that the first controller 110 and the first display 132 are in the sleep state, the power consumption of the electronic watch 100 can be greatly reduced, even if the communicator 131 communicates by the first communication method. As such, next, Embodiment 2, in which the communicator 131 can communicate by the first communication method even in the low power consumption operating state, is described.

Figure 9:
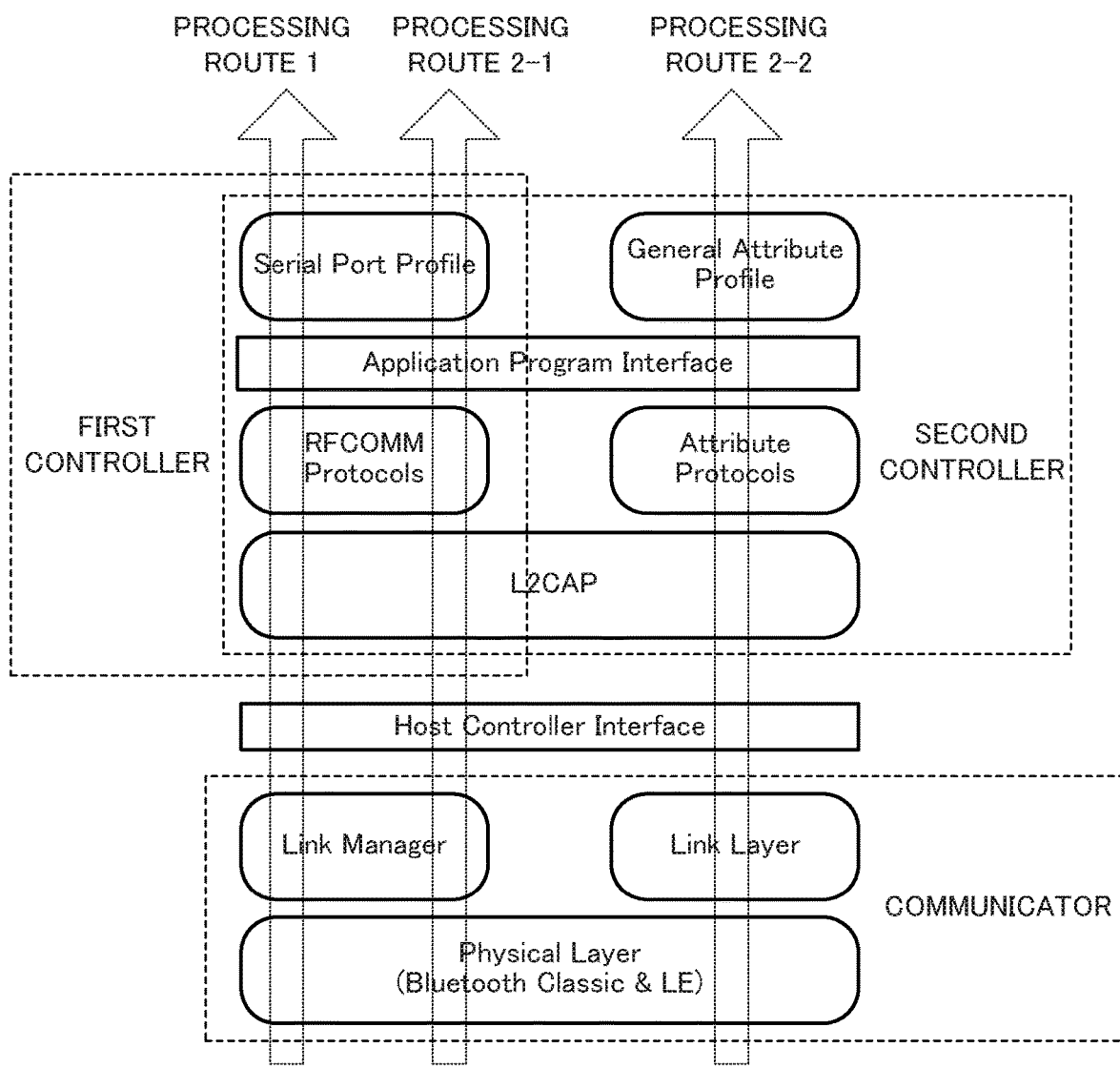
FIG. 9 is a drawing explaining a protocol stack according to Embodiment 2.

The functional configuration of the electronic watch 100 according to Embodiment 2 is the same as the functional configuration of the electronic watch 100 according to Embodiment 1. However, as illustrated in FIG. 9, in addition to the implementations of the protocol stacks of the various communication methods described in Embodiment 1, the L2CAP, the RFCOMM Protocols, and the Serial Port Profile are implemented on the second controller 120. As a result of this configuration, the second controller 120 can perform communication by the first communication method (processing route 2-1) and communication by the second communication method (processing route 2-2).

Figure 10:
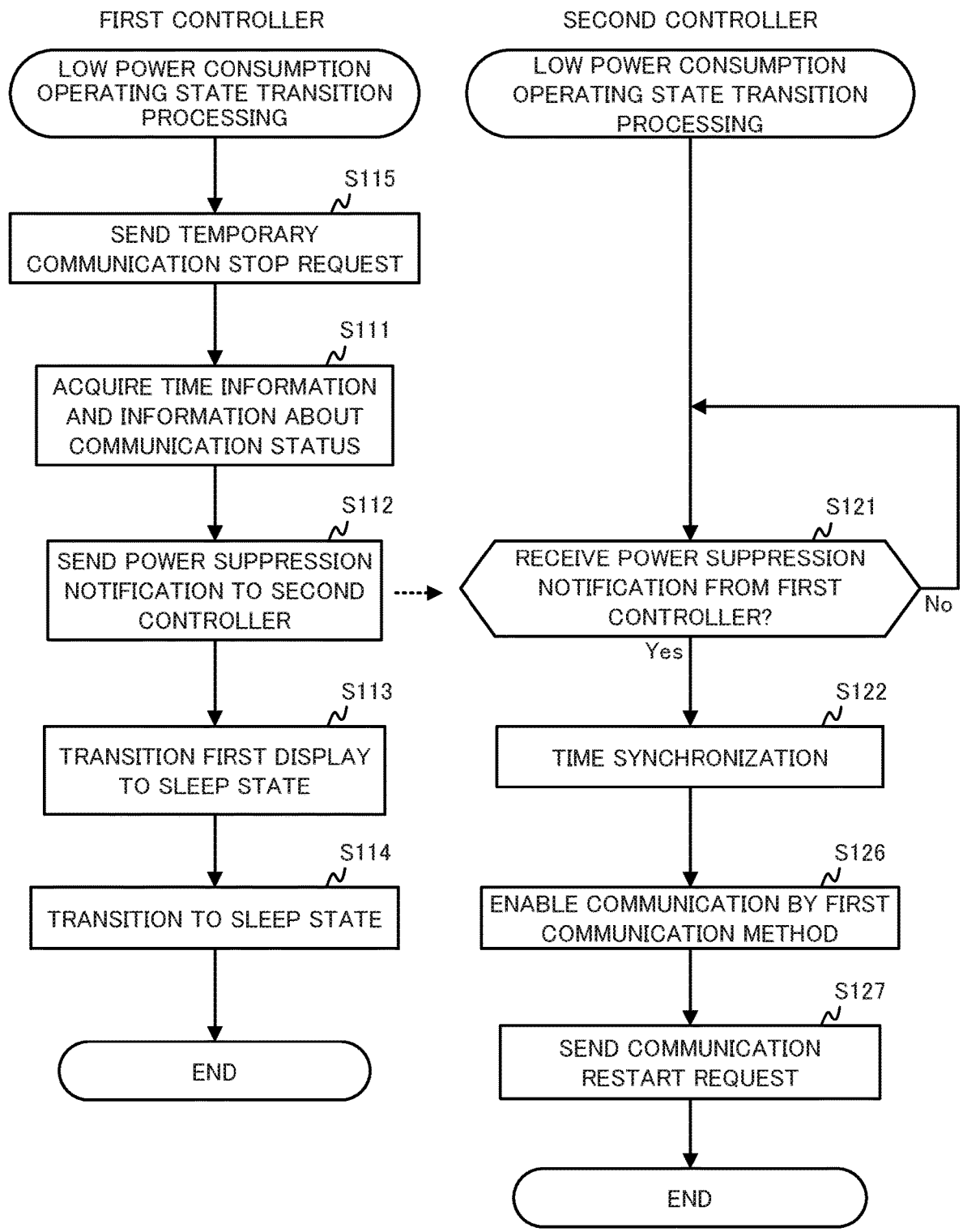
FIG. 10 is a flowchart of low power consumption operating state transition processing according to Embodiment 2.

As illustrated in FIG. 10, the low power consumption operating state transition processing according to Embodiment 2 is the same as the low power consumption operating state transition processing according to Embodiment 1 (FIG. 6), with the exceptions that step S115 and step S127 are added, and step S123 is replaced with step S126. As such, only the differences between the low power consumption operating state transition processing according to Embodiment 1 (FIG. 6) and the low power consumption operating state transition processing according to Embodiment 2 will be described.

First, since the subject of the protocol stack processing is switched from the first controller 110 to the second controller 120, the first controller 110 sends a request to temporarily stop communication (temporary communication stop request) to the smartphone 200 (step S115).

Next, in step S216, the second controller 120 switches the switch 135, thereby connecting the second controller 120 to the communicator 131 and, on the basis of the information about the communication status included in the power suppression notification, sets the communication with the partner, that the first controller 110 performs by the communicator 131, as being restartable by the first communication method (step S126). Then, the second controller 120 sends, to the smartphone 200, a request to restart communication (communication restart request) (step S127).

As a result of the processing described above, the electronic watch 100 can smoothly carry out the processing for switching the subject of the communication by the communicator 131 from the first controller 110 to the second controller 120.

Figure 11:
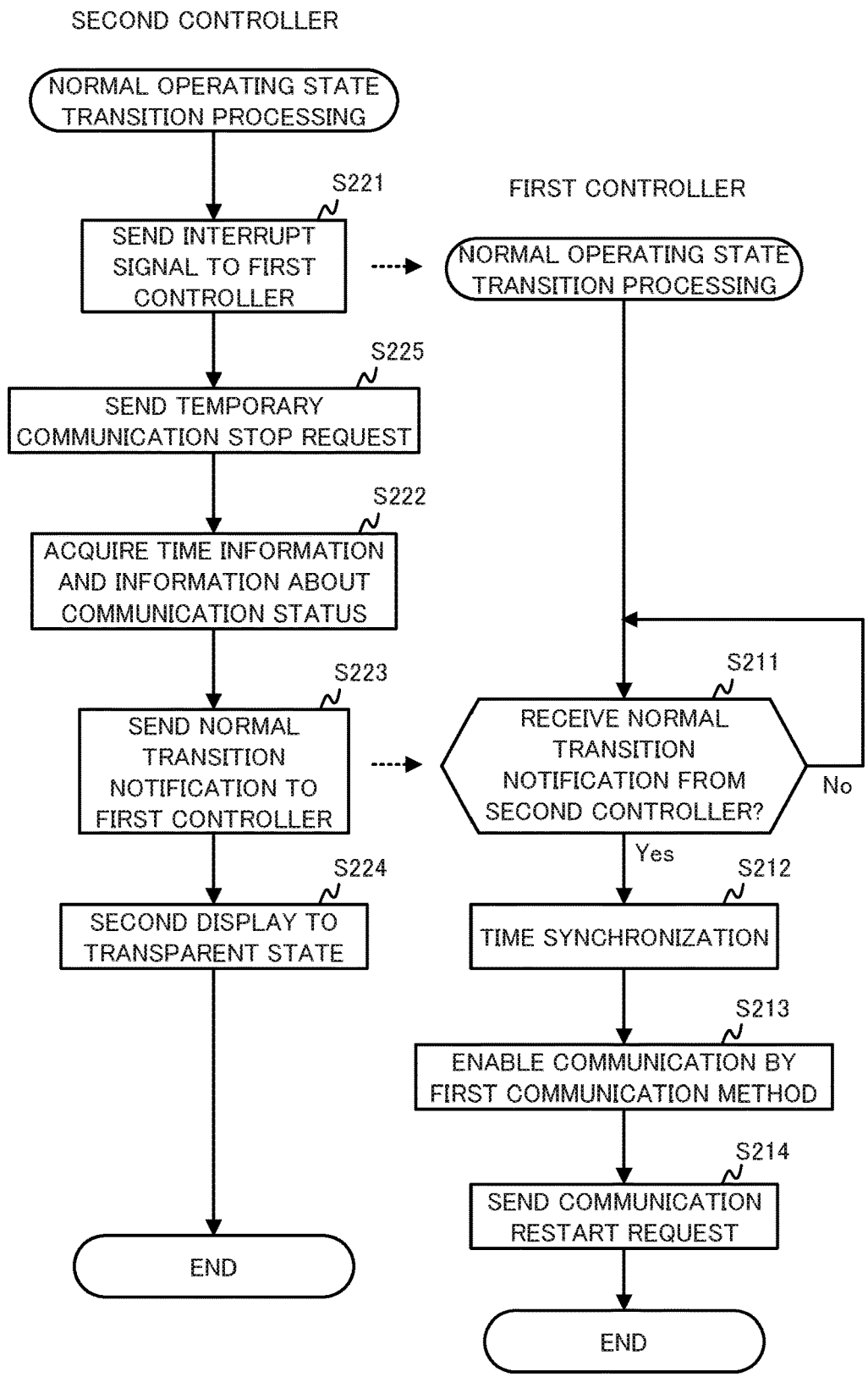
FIG. 11 is a flowchart of normal operating state transition processing according to Embodiment 2.

As illustrated in FIG. 11, the normal operating state transition processing according to Embodiment 2 is the same as the normal operating state transition processing according to Embodiment 1 (FIG. 7), with the exception that step S225 and step S214 are added. As such, only the differences between the normal operating state transition processing according to Embodiment 2 is the same as the normal operating state according to Embodiment 1 (FIG. 7) and the normal operating state transition processing according to Embodiment 2 will be described.

Since the subject of the protocol stack processing is switched from the second controller 120 to the first controller 110, the second controller 120 sends, to the smartphone 200, a request to temporarily stop communication (temporary communication stop request) (step S225). Note that step S225 may be performed before step S221.

Then, after the communication is set to restartable in step S213, the first controller 110 sends a request, to the smartphone 200, to restart communication (communication restart request) (step S214).

As a result of the processing described above, the electronic watch 100 can smoothly carry out the processing for switching the subject of the communication by the communicator 131 from the second controller 120 to the first controller 110.

The operating state switching processing according to Embodiment 2 is the same as the operating state switching processing according to Embodiment 1 (FIG. 8). However, in Embodiment 2, the communication in the low power consumption operating state is not only the second communication method, but may also be the first communication method. As such, in step S103, the notification signal may be received by the second communication method or may be received by the first communication method.

In Embodiment 2, it is not absolutely necessary to change the communication method when transitioning from the normal operating state to the low power consumption operating state. As such, in cases in which the communication method is not changed, the processing of the protocol stacks carried out by the first controller 110 (communication processing carried out with the smartphone 200) can be taken over and carried out by the second controller 120. Accordingly, the electronic watch 100 can be provided with a finer degree of low power consumption control. For example, when the electronic watch 100 is communicating with the smartphone 200, the electronic watch 100 can be transitioned to the low power consumption operating state while maintaining the first communication method and, when the electronic watch 100 is not communicating with the smartphone 200, the electronic watch 100 can transition to the low power consumption operating state by changing to the second communication method.

In Embodiment 2 as well, the operating state switching processing is carried out in the same manner as in Embodiment 1. Therefore, the electronic watch 100 is operated for as long a time as possible in the low power consumption operating state, and also transitions quickly to the normal operating state when the user attempts to execute a function other than the limited functions. Therefore, in Embodiment 2 as well, the battery life of the electronic watch 100 can be extended without the user noticing that the electronic watch 100 is in a state in which functions are limited.

Embodiment 3

In the embodiments described above, the higher layers that are above the Host Controller Interface are implemented on the first controller 110 and the second controller 120. However, it is possible to implement these higher layers on the communicator 131. Embodiment 3, which is an example of such a case, will be described.

Figure 12:
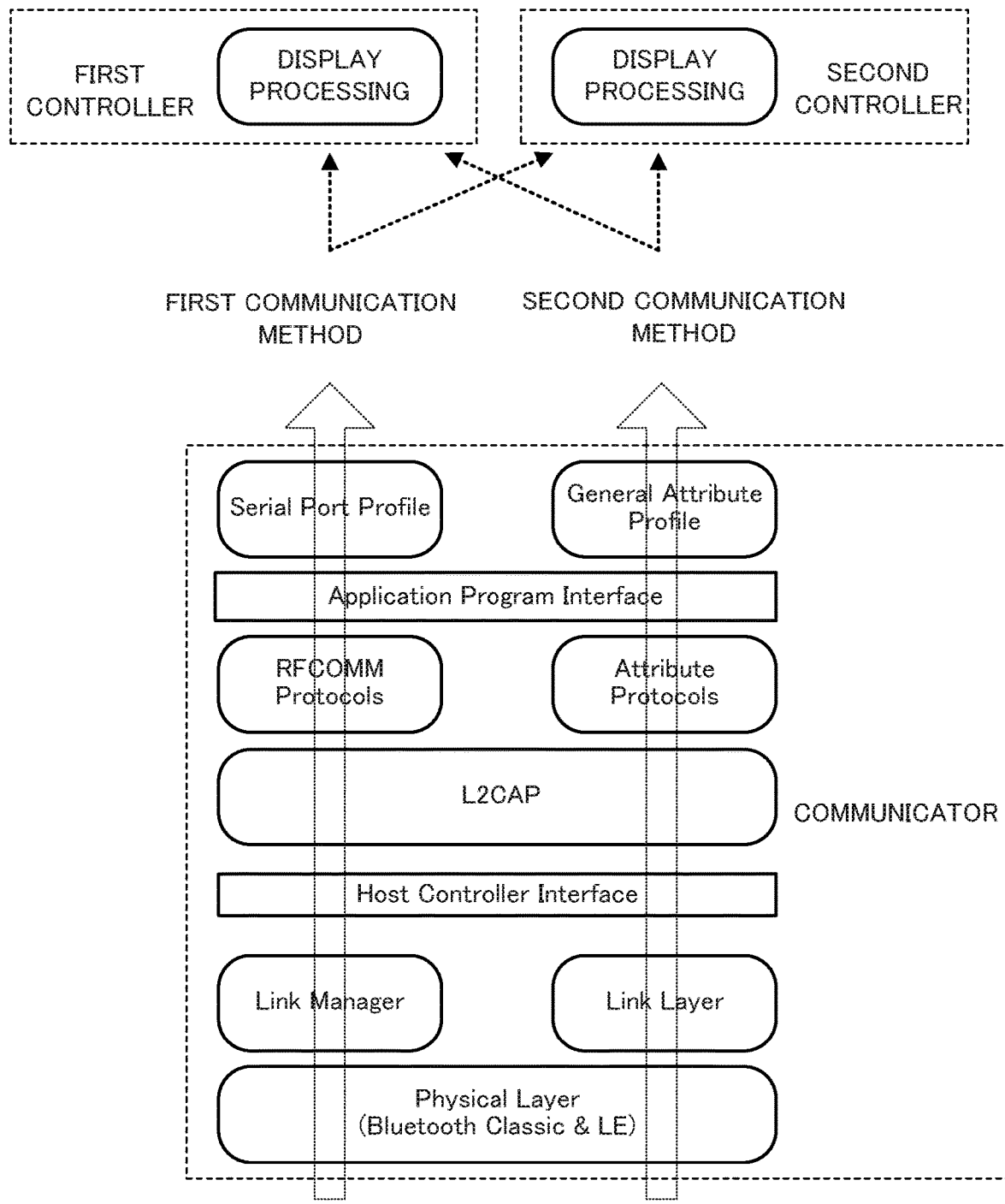
FIG. 12 is a drawing explaining a protocol stack according to Embodiment 3.

The functional configuration of the electronic watch 100 according to Embodiment 3 is the same as the functional configuration of the electronic watch 100 according to Embodiment 1. However, as illustrated in FIG. 12, the Physical Layer, the Link Manager, the Link Layer, the L2CAP, the RFCOMM Protocols, the Serial Port Profile, the Attribute Protocols, and the General Attribute Profile are implemented on the communicator 131 of the electronic watch 100 according to Embodiment 3.

Due to this configuration, the communication by the first communication method and the communication by the second communication method can be carried out by the communicator 131. Accordingly, with the electronic watch 100 according to Embodiment 3, when switching the subject of the control from the first controller 110 to the second controller 120, and when conversely switching from the second controller 120 to the first controller 110, in cases in which communication is being carried out by the communicator 131, the communication can be continued using the same communication method without switching the communication method.

The communication by the first communication method and the communication by the second communication method can be carried out by the communicator 131 without assistance from the controller. As such, only application/software that uses the data communicated by the communicator 131 needs to be implemented on the controllers. For example, in the present embodiment, as illustrated in FIG. 12, display processing for displaying, on the first display 132, data received by the communicator 131 is implemented on the first controller 110, and display processing for displaying, on the second display 136, data received by the communicator 131 is implemented on the second controller 120.

In Embodiment 3, the communication method can be switched by the first controller 110 or the second controller 120 issuing an instruction to the communicator 131 about if the communication method to be used is the first communication method or the second communication method. Aside from the switching processing of the communication method being simplified, the various processings (the low power consumption operating state transition processing, the normal operating state transition processing, and the operating state transition processing) of the electronic watch 100 according to Embodiment 3 are carried out in the same manner as described in Embodiment 1 and Embodiment 2.

With the electronic watch 100 according to Embodiment 3, the protocol stacks and profiles are implemented on the communicator 131. As a result, it is possible to carry out the switching between the first communication method and the second communication method more smoothly. Additionally, since the protocol stacks and the like are only implemented on the communicator 131, in cases in which communication is being carried out by the communicator 131 when switching the subject of control, it is not necessary to interrupt the communication to switch the communication method, and the communication can be continued by the same communication method.

The electronic watch 100 according to Embodiment 3 can carry out the same operating state switching processing as the electronic watch 100 according to Embodiment 1. Therefore, the electronic watch 100 is operated for as long a time as possible in the low power consumption operating state, and also transitions quickly to the normal operating state when the user attempts to execute a function other than the limited functions. Therefore, with the electronic watch according to Embodiment 3 as well, the battery life of the electronic watch 100 can be extended without the user noticing that the electronic watch 100 is in a state in which functions are limited.

Note that the present disclosure is not limited to the embodiment described above and various combination and modifications are possible.

For example, in the embodiments described above, examples are described in which the first communication method corresponding to the communicator 131 is a communication method that is compatible with Bluetooth (registered trademark) Classic communication standards, and the second communication method is a communication method that is compatible with BLE communication standards. However, the present disclosure is not limited thereto. For example, an embodiment is possible in which the first communication method is a communication method that is compatible with a high-speed wireless LAN communication standard such as IEEE802.11n, and the second communication method is a communication method that is compatible with Bluetooth (registered trademark) Classic communication standards. Provided that there is a relationship whereby the power consumption of the second communication method is lower than the power consumption of the first communication method, any communication standards that satisfy the required specifications can be used.

The relationship between the first display 132 and the second display 136 is the same as the relationship between the first communication method and the second communication method and, provided that the power consumption of the second display is lower than the power consumption of the first display, the electronic watch 100 can use any first display 132 and second display 136 that satisfy the required specifications. Likewise, provided that the power consumption of the second controller 120 is lower than the power consumption of the first controller 110, the electronic watch 100 can use any first controller 110 and second controller 120 that satisfy the required specifications.

In the embodiments described above, the electronic watch 100 is described as an example of an electronic device that includes the first controller 110 and the second controller 120. However, the present disclosure is not limited to electronic watches and can be applied to any electronic device that includes a first device group (the first controller 110 and the first display 132) and a processing method (the first communication method) that have high performance and high power consumption, and a second device group (the second controller 120 and the second display 136) and a processing method (the second communication method) that have lower performance and lower power consumption than the first device group and processing method. Examples of such electronic devices include smartwatches, smartphones, and wearable devices.

The programs executed by the first controller 110 and the second controller 120 can be applied by storing the programs on a non-transitory computer-readable recording medium such as a flexible disc, a compact disc (CD) ROM, a digital versatile disc (DVD) ROM, and a memory card. Furthermore, the programs can be superimposed on a carrier wave and applied via a communication medium such as the internet. For example, the programs may be posted to and distributed via a bulletin board system (BBS) on a communication network. Moreover, a configuration is possible in which the processing described above is executed by starting the programs and, under the control of the operating system (OS), executing the programs in the same manner as other applications/programs.

In addition, the specific details such as the configurations, the control procedures, and the display examples described in the embodiments may be appropriately modified without departing from the scope of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An electronic device comprising:
   a communicator configured to receive information from outside; and
   a controller configured to perform:
      a first determination processing to determine whether priority of the information received by the communicator satisfies a predetermined condition, wherein the predetermined condition is that the information is sent by a sender set as having a predetermined priority; and
      a switching processing to switch an operating state between a normal state and a lower power consumption state in which power consumption is lower than power consumption of the normal state,
      wherein, in response to determining that the priority of the information satisfies the predetermined condition during the lower power consumption state, the controller is configured to switch, in the switching processing, the operating state from the lower power consumption state to the normal state.

2. The electronic device according to claim 1,
   wherein the controller is further configured to perform:

a second determination processing to determine whether an operation of a user is not detected by a predetermined sensor for a certain continuous period of time; and in the switching processing, switch the operating state from the normal state to the lower power consumption state when the operation of the user is not detected by the predetermined sensor for the certain continuous period of time.

3. The electronic device according to claim 1, further comprising:

a first display; and a second display for which power consumption is lower than power consumption of the first display, wherein the normal state is a state in which the first display and the second display operate, and wherein the lower power consumption state is a state in which the second display operates among the first display and the second display.

4. The electronic device according to claim 1, wherein the communicator is compatible with a first communication method and a second communication method that enables communication at lower power consumption than power consumption of the first communication method, wherein the normal state is a state in which communication is performed by the first communication method, and wherein the lower power consumption state is a state in which communication is performed by the second communication method.

5. A control method to be executed by an electronic device including a communicator that receives information from outside, the control method comprising:

determining whether priority of the information received by the communicator satisfies a predetermined condition, wherein the predetermined condition is that the information is sent by a sender set as having a predetermined priority; and switching an operating state between a normal state and a lower power consumption state in which power consumption is lower than power consumption of the normal state, wherein, in response to determining that the priority of the information satisfies the predetermined condition during the lower power consumption state, the operating state is switched from the lower power consumption state to the normal state.

6. The control method according to claim 5, further comprising:

determining whether an operation of a user is not detected by a predetermined sensor for a certain continuous period of time; and switching the operating state from the normal state to the lower power consumption state when the operation of the user is not detected by the predetermined sensor for the certain continuous period of time.

7. The control method according to claim 5, wherein the electronic device further comprises a first display and a second display for which power consumption is lower than power consumption of the first display, wherein the normal state is a state in which the first display and the second display operate, and wherein the lower power consumption state is a state in which the second display operates among the first display and the second display.

8. The control method according to claim 5, wherein the communicator is compatible with a first communication method and a second communication method that enables communication at lower power consumption than power consumption of the first communication method, wherein the normal state is a state in which communication is performed by the first communication method, and wherein the lower power consumption state is a state in which communication is performed by the second communication method.

9. A non-transitory computer-readable recording medium storing a program executable by a processor of an electronic device including a communicator that receives information from outside, the program causing the computer to execute;

a first determination processing to determine whether priority of the information received by the communicator satisfies a predetermined condition, wherein the predetermined condition is that the information is sent by a sender set as having a predetermined priority; and a switching processing to switch an operating state between a normal state and a lower power consumption state in which power consumption is lower than power consumption of the normal state, wherein, in response to determining that the priority of the information satisfies the predetermined condition during the lower power consumption state, the operating state is switched, in the switching processing, from the lower power consumption state to the normal state.

10. The non-transitory computer-readable recording medium according to claim 9, wherein the program further causes the computer to execute:

a second determination processing to determine whether an operation of a user is not detected by a predetermined sensor for a certain continuous period of time; and in the switching processing, switch the operating state from the normal state to the lower power consumption state when the operation of the user is not detected by the predetermined sensor for the certain continuous period of time.

11. The non-transitory computer-readable recording medium according to claim 9, wherein the electronic device further comprises a first display and a second display for which power consumption is lower than power consumption of the first display, wherein the normal state is a state in which the first display and the second display operate, and wherein the lower power consumption state is a state in which the second display operates among the first display and the second display.

12. The non-transitory computer-readable recording medium according to claim 9, wherein the communicator is compatible with a first communication method and a second communication method that enables communication at lower power consumption than power consumption of the first communication method, wherein the normal state is a state in which communication is performed by the first communication method, and wherein the lower power consumption state is a state in which communication is performed by the second communication method.

* * * * *